US012632901B2

(12) United States Patent
Gunzinger et al.

(10) Patent No.: US 12,632,901 B2
(45) Date of Patent: May 19, 2026

(54) STOCK EXCHANGE TRADING PLATFORM

(71) Applicant: Swisstradingbox AG, Zurich (CH)

(72) Inventors: Anton Gunzinger, Zurich (CH); Edgar Blum, Niederrohrdorf (CH); Hans Burkhard, Kloten (CH); Rico Piantoni, Wila (CH); David Müller, Hinwil (CH); Markus Berner, Brugg AG (CH); Samuel Zahnd, Frauenfeld (CH)

(73) Assignee: Swisstradingbox AG, Zurich (CH)

( * ) Notice: Subject to any disclaimer, the term of this patent is extended or adjusted under 35 U.S.C. 154(b) by 494 days.

(21) Appl. No.: 17/812,110

(22) Filed: Jul. 12, 2022

(65) Prior Publication Data

US 2022/0343424 A1     Oct. 27, 2022

Related U.S. Application Data

(63) Continuation of application No. 16/729,376, filed on Dec. 28, 2019, now abandoned, which is a (Continued)

(30) Foreign Application Priority Data

Jun. 5, 2014    (CH) ..................................... 00866/14

(51) Int. Cl.
| | |
|---|---|
| *G06Q 40/00* | (2023.01) |
| *G06Q 40/04* | (2012.01) |

(52) U.S. Cl.
CPC .................................... *G06Q 40/04* (2013.01)

(58) Field of Classification Search
CPC .................................................... G06Q 40/04
See application file for complete search history.

(56) References Cited

U.S. PATENT DOCUMENTS

| | | | | |
|---|---|---|---|---|
| 4,412,287 | A | * | 10/1983 | Braddock, III ........ G06Q 40/04 705/37 |
| 5,367,209 | A | * | 11/1994 | Hauck .............. H03K 19/17704 326/39 |

(Continued)

FOREIGN PATENT DOCUMENTS

| | | | |
|---|---|---|---|
| EP | 0411748 A2 | 2/1991 | |
| WO | WO-0165403 A2 * | 9/2001 | ......... G06Q 30/0275 |

(Continued)

OTHER PUBLICATIONS

Keromytis et al., "SOS: An Architecture for Mitigating DDoS Attacks," IEEE Journal on Selected Areas in Communications, vol. 22, No. 1, Jan. 2004 (Year: 2004).*

(Continued)

*Primary Examiner* — Christine M Tran
*Assistant Examiner* — William B. Bunker
(74) *Attorney, Agent, or Firm* — Oppedahl Patent Law Firm LLC

(57) ABSTRACT

The invention relates to a stock exchange trading platform for a plurality of trader data processing devices that are in communication connection with the trading platform, wherein the trading platform has a trading platform data processing device ("matcher"), which is able to store orders generated by one of the trader data processing devices in an order book, or to fill a matching order that is already recorded in the order book, at least partially, to acknowledge such received orders to the dispatching trader data processing device, and furthermore, to send messages to a plurality of connected trader data processing devices (in the case of a trading system with equally entitled traders, to everybody) in a broadcast mode. The trading platform is in particular characterized in that a unit of the trading data processing
(Continued)

Figure 1:
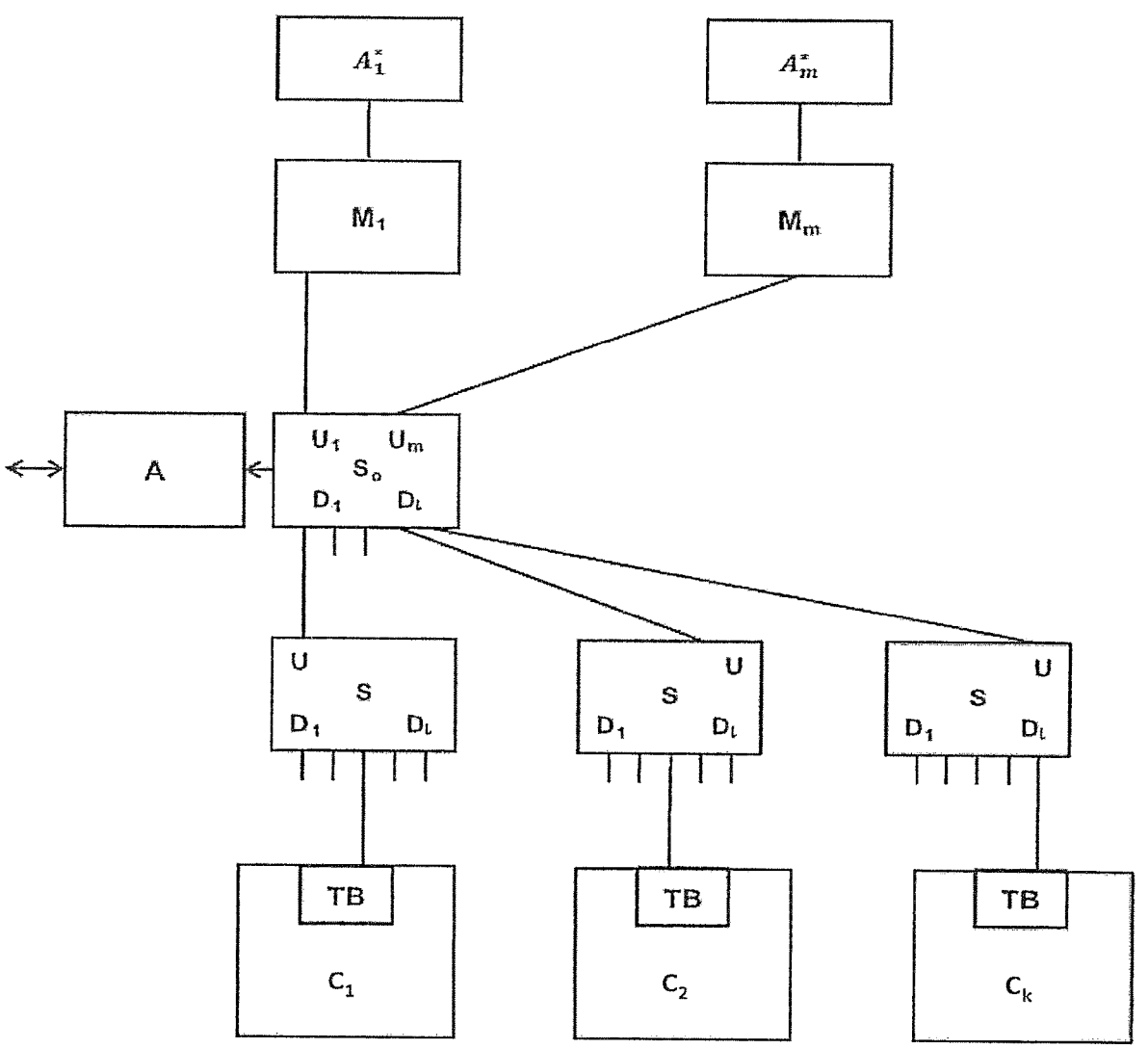

device controlling the optional execution or storing of the orders is configured as a dedicated logic circuit.

8 Claims, 6 Drawing Sheets

Related U.S. Application Data continuation of application No. 15/315,408, filed as application No. PCT/CH2015/000083 on Jun. 3, 2015, now abandoned.

(56) References Cited

U.S. PATENT DOCUMENTS

| | | | | |
|---|---|---|---|---|
| 5,396,126 | A * | 3/1995 | Britton | H03K 19/17796 |
| | | | | 326/39 |
| 6,275,491 | B1 * | 8/2001 | Prasad | H04L 49/309 |
| | | | | 370/389 |
| 7,768,314 | B2 * | 8/2010 | Matsumoto | H03K 19/17796 |
| | | | | 326/38 |
| 8,566,218 | B2 | 10/2013 | Czupek | |
| 8,655,769 | B2 | 2/2014 | Cooke et al. | |
| 8,832,211 | B1 * | 9/2014 | Lebedev | H04L 49/201 |
| | | | | 705/7.29 |
| 9,038,189 | B1 * | 5/2015 | Stevens | G06F 21/6245 |
| | | | | 726/26 |
| 9,501,795 | B1 * | 11/2016 | Friedman | G06Q 40/06 |
| 9,792,649 | B1 * | 10/2017 | Lebedev | G06Q 10/0639 |
| 10,037,568 | B2 | 7/2018 | Taylor | |
| 10,262,365 | B2 | 4/2019 | Venkataraman | |
| 10,439,833 | B1 * | 10/2019 | Lebedev | H04L 49/201 |
| 10,650,450 | B2 * | 5/2020 | Aisen | H04L 43/0858 |
| 2003/0055769 | A1 * | 3/2003 | RuDusky | G06Q 30/02 |
| | | | | 705/37 |
| 2003/0061453 | A1 * | 3/2003 | Cosky | G06F 13/4243 |
| | | | | 711/154 |
| 2005/0074033 | A1 * | 4/2005 | Chauveau | G06Q 40/04 |
| | | | | 370/503 |
| 2008/0168370 | A1 * | 7/2008 | Maher | G06Q 40/06 |
| | | | | 715/764 |
| 2008/0243675 | A1 | 10/2008 | Parsons et al. | |
| 2012/0296797 | A1 | 11/2012 | Jensen et al. | |
| 2013/0211991 | A1 * | 8/2013 | Patel | G06Q 40/04 |
| | | | | 705/37 |
| 2013/0262287 | A1 | 10/2013 | Parsons et al. | |
| 2014/0143121 | A1 | 5/2014 | Stevens | |
| 2014/0180905 | A1 | 6/2014 | Parsons et al. | |
| 2014/0249979 | A1 * | 9/2014 | Wallener | G06Q 40/04 |
| | | | | 705/37 |
| 2015/0073967 | A1 * | 3/2015 | Katsuyama | G06Q 30/08 |
| | | | | 705/37 |
| 2015/0088724 | A1 * | 3/2015 | Brumfield | G06Q 40/06 |
| | | | | 705/37 |
| 2015/0127509 | A1 * | 5/2015 | Studnitzer | G06Q 40/04 |
| | | | | 705/37 |

FOREIGN PATENT DOCUMENTS

| | | | | | |
|---|---|---|---|---|---|
| WO | WO-0209403 | A2 * | 1/2002 | | G06F 15/7867 |
| WO | WO-2007016459 | A2 * | 2/2007 | | G06Q 30/0251 |
| WO | WO-2010077829 | A1 * | 7/2010 | | G06Q 40/00 |
| WO | WO-2014043420 | A1 * | 3/2014 | | G06Q 30/08 |
| WO | WO-2015069688 | A2 * | 5/2015 | | G06Q 40/08 |
| WO | WO-2018031647 | A1 * | 2/2018 | | G06Q 10/1093 |

OTHER PUBLICATIONS

Stavrou et al., "WebOS: an overlay-based system for protecting web servers from denial of service attacks," Elsevier, Science Direct, Computer Networks 48 (2005) 781-807 2005 (Year: 2005).*

Kumar et al., "Design and Implementation of Router Arbitration in Network on Chip," Dept. of ECE, Bhaktavatsalam Polytechnic College, Kanchipuram, Tamilnadu, India 2014 (Year: 2014).*

Kavitha et al., "FPGA Implementation of Arbiters Algorithm for Network-on-Chip," ARPN journal of Engineering and Applied Sciences, vol. 11, No. 19, Oct. 2016 (Year: 2016).*

Written Opinion of Intellectual Property Office of Singapore for application No. 11201610187R, mailed on Dec. 11, 2017.

"FPGA Accelerated Low-Latency Market Data Feed Processing" Gareth W. Morris et al., High Performance Interconnects 2009, HOTI2009, 17th IEE Symposium On, IEEE, Aug. 25, 2009, pp. 83-89.

"A Low-Latency Library in FPGA Hardware for High Frequency Trading (HFT)," John W. Lockwood et al., High Performance Interconnects, (HOTI) 2012 IEEE 20th Annual Symposium On, IEEE, Aug. 22, 2012, pp. 9-16.

"High Frequency Trading Acceleration Using FPGAs," Christian Leber et al., Field Programmable Logic and Applications, (FPL), 2011 International Conference On, IEEE, Sep. 5, 2011, pp. 317-322.

International Search Report for PCT/CH2015/000083, mailed Aug. 14, 2015.

Written Opinion of International Searching Authority for PCT/CH2015/000083, mailed Aug. 14, 2015.

International Preliminary Report on Patentability for PCT/CH2015/000083, issued Dec. 6, 2016.

CH Search Report for application No. CH 8662014, mailed Sep. 26, 2014.

* cited by examiner

STOCK EXCHANGE TRADING PLATFORM

The present invention relates to a stock exchange trading platform, a stock exchange trading system and a network interface for a stock exchange trading system.

For years now, stock market trading has been carried out almost exclusively in a computerised manner. Thereby, the traders sit at a computer terminal, and this terminal is connected to a computer-implemented trading platform via a computer network. Such a trading platform as its key component comprises at least one so-called "matcher" (trading platform data processing device, i.e. an order accounting and implementation unit), in which orders are stored in an order book or are carried out. The matcher is connected on the one hand—generally via at least one switch—to the traders, and on the other hand to a backoffice (order post-processing system), in which the execution of the order is completed and the respective financial transaction is processed for example.

If a trader is interested in a stock trade, then he places an order at the trading platform. This order comprises the title concerned, information as to whether the title should be bought or sold (buy/sell), the desired quantity as well as the price. The trading platform manages the order book. An incoming order is examined as to whether there is a matching, stored order. If not, then the order is stored in the order book and acknowledgment of receipt is given to the ordering party (client). If yes, then the trade is executed, registered in the sales ledger and both parties are informed. Information concerning the accomplished trade, in an anonymous form (i.e. without information as to the identity of two involved traders), then also goes to all traders (broadcast). Of course, it can also be the case that an order is only able to be partly executed, and then a residual order remains in the order book after carrying out the trade. Any other order variants (amongst other things: market orders, accept orders, fill-or-kill orders, iceberg orders) are likewise assisted, apart from the mentioned order type with the attributes buy/sell, quantity and price.

Three types of communication primarily result from this communication pattern for electronic stock exchange trading:

a) trader→trading platform (point→point)
b) trading platform→trader (point→point, hierarchical)
c) trading platform→all traders (broadcast)

A network for rapid electronic trading should assist these communication patterns.

Added to this is the fact that the decision making on the part of the trader is effected with extensive computer assistance; in some cases it is even a computer program which makes the effective decision on the part of the trader (of course in accordance with the instructions of the trader). Here, one speaks of algotrading.

The network speed, the processing speed in the trading system and the processing speed in the trader system are crucially important with this application. Whereas electronic trading systems initially operated in seconds (and thus by an order of magnitude more rapidly than human trading systems), nowadays one operates in the millisecond range and times of a few microseconds are strived for.

If standardised networks such as TCP/IP are applied for these applications, then the transfer latency just of the network is often a few 10 μs. Quick traders however desire "round-trip" times (i.e. the time between the submission of an order by the trader and the arrival of receipt at the trader) of below 10 μs. Amongst other things, supercomputer communication networks with latencies of a few μs have been suggested, in order to achieve this task. These networks, although fulfilling the demands with regard to latency, however entail a few disadvantages: supercomputer networks are mostly designed with a view to symmetrical communication (everyone with everyone), but in financial applications there are practically only "many-to-one" and "one-to-many" communications as well as point-to-point communications between a trading platform and a certain trader data processing device. The "everyone to everyone" communication of supercomputer networks thereby not only entails a high effort (and thus higher costs), but on account of disturbances (deliberate or unintended) can also lead to an unfair behaviour of the communication system.

Fairness is an important topic with regard to the equal treatment of orders submitted by the traders, as well as with regard to the principle that traders informed by broadcast all have the same level of information at all times. Such fairness is not possible with the application of traditional networks, even from the field of supercomputers, without special extensive measures. Moreover, one should ensure that the system cannot become overloaded in such networks. High-availability computer systems should also be available.

One of the objects of this invention is to eliminate the disadvantages of a supercomputer network, without thereby losing the advantage of the high speed.

Moreover, it can be advantageous if a network for this application of "stock exchange" were to be scalable, and almost any number of trader data processing devices were able to be connected. Thereby, it can also make sense to apply several trading platform data processing devices (matchers) for reasons of performance.

A further challenge is the "flow control" in the network. The following problem can thereby surface: the trading platform only has a limited buffer for incoming orders. A trader can cause the trading system to become overloaded, and orders can be lost.

A further challenge is the intelligent receiving of information on the part of the trader. With a high-performance system, there can be times, at which the trader data processing device is no longer capable of processing and sorting the flood of information inundating it.

Finally, most of these systems are not designed as highly-availability systems. This characteristic can only be realised at a later stage at a very high expense/effort.

It is the object of the present invention, to at least partly eliminate the disadvantages outlined above and to provide a system and method which meets the demands concerning speed, fairness, functional reliability, during operation and after the failure of components, as well as meeting the demands concerning the consumption of energy and resources.

According to a first aspect of the invention, an electronic platform for stock exchange trading is provided for a plurality of trader data processing devices which are in communicating connection with the trading platform, wherein the trading platform comprises a trading platform data processing device (matcher) with memory means and a controlling unit. The controlling unit is designed to process orders produced by one of the trader data processing devices and thereby to compare the received orders with stored orders which are stored in the memory means and which form an order book, and to store a received order in the memory means in a manner depending on a result of the comparison, or, given a matching order already stored in the memory means, to at least partly carry it out and to at least partly delete the matching order in the memory means or to mark its as executed, to acknowledge the receipt of such arrived messages, to the dispatching trader data processing device and moreover, in a broadcast mode, to send broadcast messages with information concerning executed orders and/ or orders stored in the memory means, to a plurality of connected trader data processing devices, as well to transfer transaction data concerning the executed orders, to an order post-processing system. The trading platform in particular is characterised in that the controlling unit of the trading platform data processing device is designed as a dedicated logic circuit.

The controlling unit of the matcher which selectively controls the execution or storage of the orders is the central key component of the trading platform. This unit compares incoming orders with the order book, carries out trade transactions (including confirmation, entry into the trade book and/or communication with the backoffice, as the case may be, notification to many or all participants) and/or registers orders into the order book, removes executed orders or modifies entries of partly executed orders.

The order post-processing system, in which the order execution is completed and for example the respective financial transaction processed, is indicated as the backoffice. The transaction data which is transferred to the backoffice after carrying out the order contains the quantity and price of the traded titles and permits the transaction to be financially and "physically" (delivery of the title) executed.

A dedicated logic circuit is a hardware component or a group of hardware components, in which the logic functions, by way of which signals or data are processed, are implemented in a predefined manner by way of given circuits which are present in the hardware itself and which are defined. The logic circuit thus forms a function structure with blocks which are connected amongst one another. This is in contrast to main processors of conventional computers (including server-computers) which are designed as "generic", universally useable microprocessors which work off a sequence of commands provided in a memory (as software), wherein it is only this software and not the circuit itself which is for a specific purpose.

Such a dedicated logic circuit can be designed for example as a field programmable gate array (FPGA). The FPGA is dedicated by way of the configuration i.e. is designed in an application-specific manner.

Such a FPGA can comprise memory cells (e.g. EEPROM, EPROM, SRAM, flash), in which the configuration is stored. The configuration is transferred onto the actual circuit on starting operation in each case. The FPGA can alternatively also be permanently programmed, by way of the connections between the switch units being permanently configured, for example by way of so-called antifuse technology.

The configuration of an FPGA is not to be confused with programming in the conventional context, i.e. with the creation of software for a processor. In the case of an FPGA or another configurable logic circuit, circuit structures are created by way of hardware description languages or in the form of schematics, and these structures are subsequently transferred into the component for the purpose of configuration. Switch positions which are defined in the configurable logic circuit are activated and/or deactivated by way of this. What results from this is a specifically implemented digital circuit, which generally operates in an extremely parallel manner due to the fact that each unit of the switch position operates in a parallel manner. In contrast to this, even the quickest of microprocessors at the most carry out few or mostly even no operations in parallel.

Complex programmable logic devices (CPLD) are also often counted as belonging to the FPGAs and these represent a further example of configurable logic circuits.

A further example of dedicated logic circuits are application-specific integrated circuits (ASICs), whose switching logic (circuit logic) is set on manufacture and can no longer be changed.

Dedicated logic circuits are widespread in the state of the art, as standard components for carrying out defined, always identical tasks, for example in controls, for the conversion (coding/decoding) of data, digital filtering etc. Until now, they have not been considered at all for central units in complex systems—the application of a "trading platform" clearly represents such a system—amongst other things due to the fact that they are not considered at all flexible enough for such applications.

The recognition, on which the present invention is based is, is the fact that in spite of this, the application "matcher of a stock exchange trading platform" is suitable for the implementation by way of a dedicated logic circuit in a downright outstanding manner, due to the fact that the tasks of the matcher, with all the complexity of the stock exchange business and despite the sheer quantity of data to be overcome, can be reduced to very few basic transactions and such a reduction is even advantageous.

The advantages which can be achieved by the procedure according to the first aspect are striking. The data processing speed, on account of the parallelism of the data processing which freely results in dedicated logic circuits, is much higher than with the application of microprocessors of the common type, even compared to highly refined and powerful multi-core processors. The latency times can be significantly reduced in comparison to the state of the art. Moreover, the matcher can be very much smaller than the computation centres which are used according to the state of the art for this purpose, and the electricity consumption is only a fraction of the electricity consumption of these. The procedure according to the first aspect of the inventing also permits the forgoing of PCIe transitions, and a network stack processing in the operating system is also avoided: the latency-critical processing can be carried out in a completely autonomous manner due to the dedicated logic in the matcher. The data does not need to be communicated to the central processor (CPU) via PCIe and at the most is processed by the operating system by way of network stack processing. The gain in time is striking by way of this. It has been found that the latency time can be reduced from the 30-50 microseconds common for very rapid platforms according to the state of the art, to approx. 10 microseconds.

Of course, it is also possible to realise some part-processes in software, as is the case nowadays.

The demands concerning the tasks to be carried out by a matcher are almost perfectly met by way of the procedure according to the first aspect. These demands are highly complex in a certain sense. The complexity results from the sheer number of messages which are to be processed practically simultaneously, wherein the actual core task of the matcher, for reasons of fairness, can only be divided onto part-tasks to be carried out in parallel in a limited manner; the actual "matching" must take place according to strict stock exchange rules. Stock market trading platforms according to the state of the art are accordingly highly complex formations, which is also manifested in their sheer size, in the maintenance expense and in the energy consumption. A recognition on which the invention is based is the fact that the actual tasks can be reduced to a manageable core, despite such complexity, and that these can be implemented in an almost ideal manner by way of a hardware solution—and a dedicated logic circuit represents such—and this results in a massive reduction of the complexity.

According to a second aspect of the invention, a stock exchange trading system is provided which comprises:

a plurality of trader data processing devices; and a trading platform—in particular according to the first aspect—with a trading platform data processing device with memory means and with a controlling unit and at least one switch, via which the trading platform data processing device is connected to the trader data processing devices;

wherein each trader data processing device is capable of submitting messages with orders contained therein, to the trading platform, and the controlling unit is designed to process these messages and thereby to compare the received orders with stored orders which are stored in the memory means and which form an order book, and, depending on a result of the comparison, to store a received order in the memory means or, given a matching order already stored in the memory means, to at least partly carry it out, to delete the matching order at least partly in the memory means, or to mark it as executed, and to acknowledge the storage or at least partial execution to the trader data processing device, as well as to transfer transaction data concerning the executed orders, to an order post-processing system;

and wherein a switching logic of the at least one switch only permits messages from a trader data processing device to the trading platform data processing device, from the trading platform data processing device to a certain trader data processing device and from the trading platform data processing device to a group of trader data processing devices or to all trader data processing devices.

The second aspect of the invention also relates to an electronic platform for such a system.

A "trader data processing device" can be an integrated computer. However, it does not need to be a unit in the context of a "personal computer". It can also be divided onto several units which under certain circumstances are spatially separated, wherein the same applies to other data processing devices which are described in this application.

In this text, a switch is generally to indicate a network node which permits a selective transfer to certain (individual or several, under certain circumstances selectively also to all) connected devices—in the present context, the switch at the minimum permits an incoming order from a trader data processing device to be led further onto one or more trading platform data processing device(s), and not for example also to all other trader data processing devices. With regard to the context used here, a switch is a device ensuring this functionality, independently of whether all elements belonging thereto are arranged physically close to one another (for example in a common housing) or not. With the network architecture according to the second aspect of the invention, the switch can also be indicated as an aggregation switch.

A switch according to the second aspect of the invention moreover, additionally to this generally valid characteristic also comprises the switching logic described above.

In embodiments, the switch in particular is designed as a dedicated logic circuit.

A group of trader data processing devices for example can be a defined group which is interested in a certain segment of traded titles. In particular, the system can be configured such that all participants who are interested in a certain title are treated equally concerning information on this title. The system is often even configured such that all participants always receive the respective data in the broadcast mode.

For example, one can envisage the switch—designed for example as a dedicated logic circuit—envisaging physically different paths, on the one hand for data flows from the traders in the direction of the matcher and on the other hand from the matcher in the direction of the traders. The first path (from the trader to the matcher) thereby envisages a transfer of a message coming from one of the inputs, in the direction of the matcher, whereas the second path (from the matcher to the traders) selectively permits a point-to-point connection (message goes to the output which is assigned to a trader) or a broadcast connection (message goes to a multitude of outputs, in particular to all outputs).

In particular, in each switch, one can envisage a first arbiter (responsible for the transfer of messages in the direction of the trader to the matcher; "uplink") setting an uplink switch (multiplexer) such that the respective connection from the dispatching data processing device or the respective network node upwards to the matcher arises. A second arbiter (responsible for the transfer of messages in the direction of the matcher to the trader; "downlink") sets a downlink switch (demultiplexer) such that either a connection from the matcher or network node to a certain trader/network node or to a group/to all, arises.

With the procedure according to the second aspect of the invention, the communication pattern resulting in the electronic stock exchange trading is therefore implemented in the switching logic of the network from the very beginning. This is such that message flows are not possible at all if they do not correspond to the communication pattern. This is in contrast to the state of the art, with which the flexibility of the communication possibilities is unequally higher and the communication patterns only result by way of a respective programming of the network participants, on account of the application of standard components despite them being more powerful, and of the application of protocols such as TCP/IP.

The procedure according to the second aspect of the invention for example has the advantage of simplicity—also with regard to security and examination of the procedures. The advantage of improved network speed also results due to this procedure, since the communication paths are defined from the very beginning by the switching logic and the working off of corresponding steps defined in the software is therefore done away with. The procedure is also advantageous concerning reasons of fairness. It is simply ensured that certain procedures are not delayed or accelerated, for example by way of trader computer to trader computer messages—since such message paths do not occur at all in the trading system The procedure according to the second aspect of the invention of course does not rule out the participants of the trading system being in communication connection with one another on yet another route, of example via a conventional, slower network.

According to a third aspect of the invention, a trader data processing device of a stock exchange trading system, in particular according to aspect 1 or 2 is provided, which, as is known per se comprises a central unit with a central processor (CPU), with a central memory means having an operating system and in general also with user interface, as well as comprises a network interface, as an interface to the trading platform, which is in communication connection with the central unit. Such an interface can be implemented for example by way of a network card.

According to the third aspect of the invention, the network interface now comprises memory means for storing condition data of a current condition of the stock market trading system, for example for tracking the order book, at least for the titles of relevance to the respective trader, as well as a computation device which is designed as a dedicated logic circuit in a manner such that the computation device is capable of submitting orders in the form of messages to the trading platform, according to specifications of the central unit, in dependence on the condition data.

Dedicated logic circuits, for example ASICs or FPGAs on network cards are known per se, for example for protocol conversions or other fixed tasks, under certain circumstances also in the context of algotrading. According to the third aspect however, one suggests a dedicated logic circuit being used peripherally, directly in the network interface for algotrading, i.e. without data flowing through the central unit. This permits the trader data processing devices to be able to react very rapidly to incoming information and for example of being able to immediately execute an order when the price of a title of interest falls below a defined value (=specification of the central unit).

If the trader wishes to react very quickly to a change of the market, then according to the state of the art he must first convert the data sent with common stock exchange protocols (UDP; TCP), on the communication card, transfer it to the trader computer, processes it there and subsequently write it back onto the communication card. Much valuable time is therefore wasted. In contrast, on implementation of the third aspect of the invention, the trader is put in the position of being able to react even more quickly to events on the stock exchange, due to the rapid, programmable computation unit on the network interface, said unit directly accessing the arriving data without conversion from a standard protocol and dispatching orders in a direct manner and furthermore also yet having a rapid local memory.

The combination of the third aspect with the first aspect is particularly advantageous. One can then envisage protocols suitable for the applied hardware being used for the data exchange between the network interface and the matcher, without the application of the slower standard protocols, i.e. the protocol conversions are also done away with.

In particular, one can envisage the network interface comprising at least one network interface bus, via which on the one hand incoming message from the network are transferred to the central unit and on the other hand messages (orders or likewise) are transferred from the central unit to the network (specifically: to the network interface). The computation device which is designed as a dedicated logic circuit is then for example arranged on this bus, for example likewise in a direct manner, i.e. it is capable of reading data running via the bus as well as writing data onto this.

The network interface bus can for example feature a read bus (via which data coming from the network runs) and a write bus (via which data to be transferred into the network runs), wherein the computation device is then in communication connection with both, with the read bus and with the write bus.

The network interface bus can optionally be different from the bus of the central unit (WCB workstation communication bus), wherein an interface (WI workstations interface) then connects both bus systems.

The trader data processing device, with the help of an optional additional alarm unit, can be informed extremely promptly when a certain event occurs (e.g. if a predefined price has been reached, the number of entries in the order book (which is to say in the part of the order book which is held as a copy by the trader data processing device) is fallen short off, etc.). The trader data processing device can be additionally relieved by way of this additional function of the network interface (i.e. for example of the trader network card).

It is often desirable for the trader to recognise the time of the individual trade in a very high resolution. A time generator is optionally located on the communication card, in order to achieve this.

The third aspect also relates to a network interface (in particular network card) for such a trader data processing device:

The following features can be provided in each case alone or in an arbitrary combination, likewise in the embodiments of the first, second and/or third aspect:

The trading system can be constructed in a tree-like hierarchical manner with several levels, wherein the network nodes of the levels are formed in each case by switches, each with at least one uplink connection and several downlink connections.

Each trader data processing device is connected to the trading platform data processing device by the same number of levels (with the same number of switches).

Each trader data processing device has an identical network interface (an identical network card TB).

Also several trading platform data processing devices (several matchers) can be applied in order to increase the performance of the system, wherein each trading platform data processing device is responsible for one or several titles. The transfer to the responsible/correct trading platform data processing device can be effected in the "uppermost" network node (switch), e.g. by way of the target address.

The "uppermost" network node can have a further output which stores all relevant messages which are transferred by the network node, in an archive A. In other words, an archiving unit which protocols the orders and the transactions will be connected directly to the network node (i.e. to the switch) of the highest level and not necessarily to the matcher itself.

A central archiving moreover freely results in the case of an—optional—segmentation of the matcher onto several matchers with fixed competences.

Such an archive for example can be available to the backoffice for further processing. An advantage is the fact that the trading platform data processing device is not burdened by the archiving: the data is accessed there from the quasi autonomous archive, past which it flows in any case. The matcher is relieved of a task which per se is very important, on account of this, which complements very well with the other measures for increasing the speed.

Alternatively, each trading platform processing device can have its own archive (A*).

The trader data processing devices keep copies of the parts of the order books which are of interest to the respective trader—and these can encompass the complete order book.

The time between the order and the response of the trading system can be measured in a precise manner by the mentioned time generator, for the purpose of debugging of example.

The system can be configured to immediately delete all open orders of a certain trading participant from the system, in a single order (mass cancel MC).

The orders to the trading platform can be provided with a time limit and be automatically deleted after completion of the time limit (time-of-life TOL).

With embodiments of the system as a redundant system, a unit which further processes the first valid message (for example transfers it) and suppresses identical copies can be present on the part of each trader.

Likewise in the embodiments of the first, second and/or third aspect, one can envisage all authorisations of the trader for each order being examined in real-time before execution of the order. Complementarily or alternatively, one can envisage the relevant limits for each trading participant (e.g. the total value of all orders present in the book, etc.) being tracked and examined in real-time before the execution of the order. These measures which can each be realised individually or in combination serve for the possible self-regulation in the trade.

Figure 2:
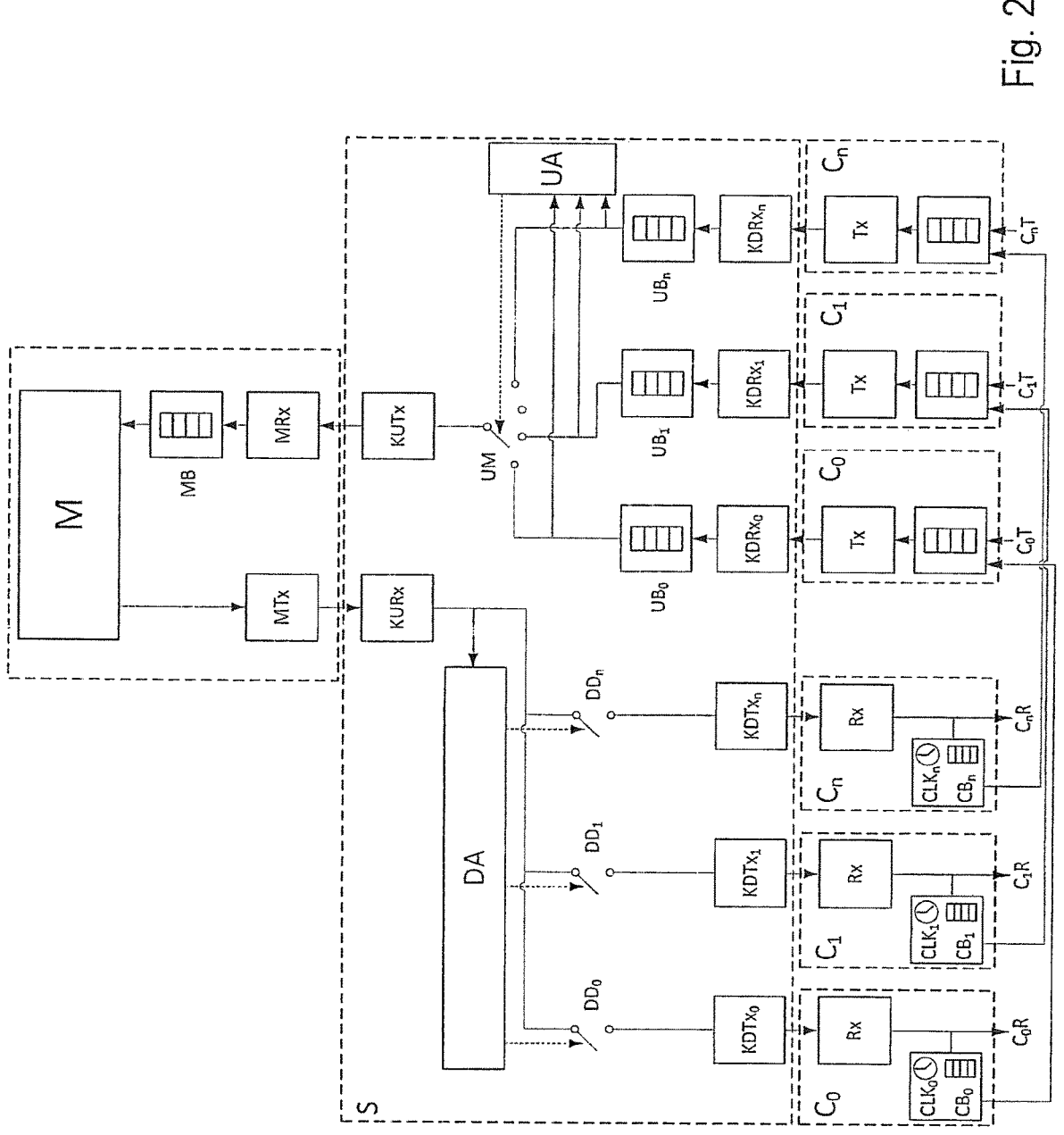
Figure 3:
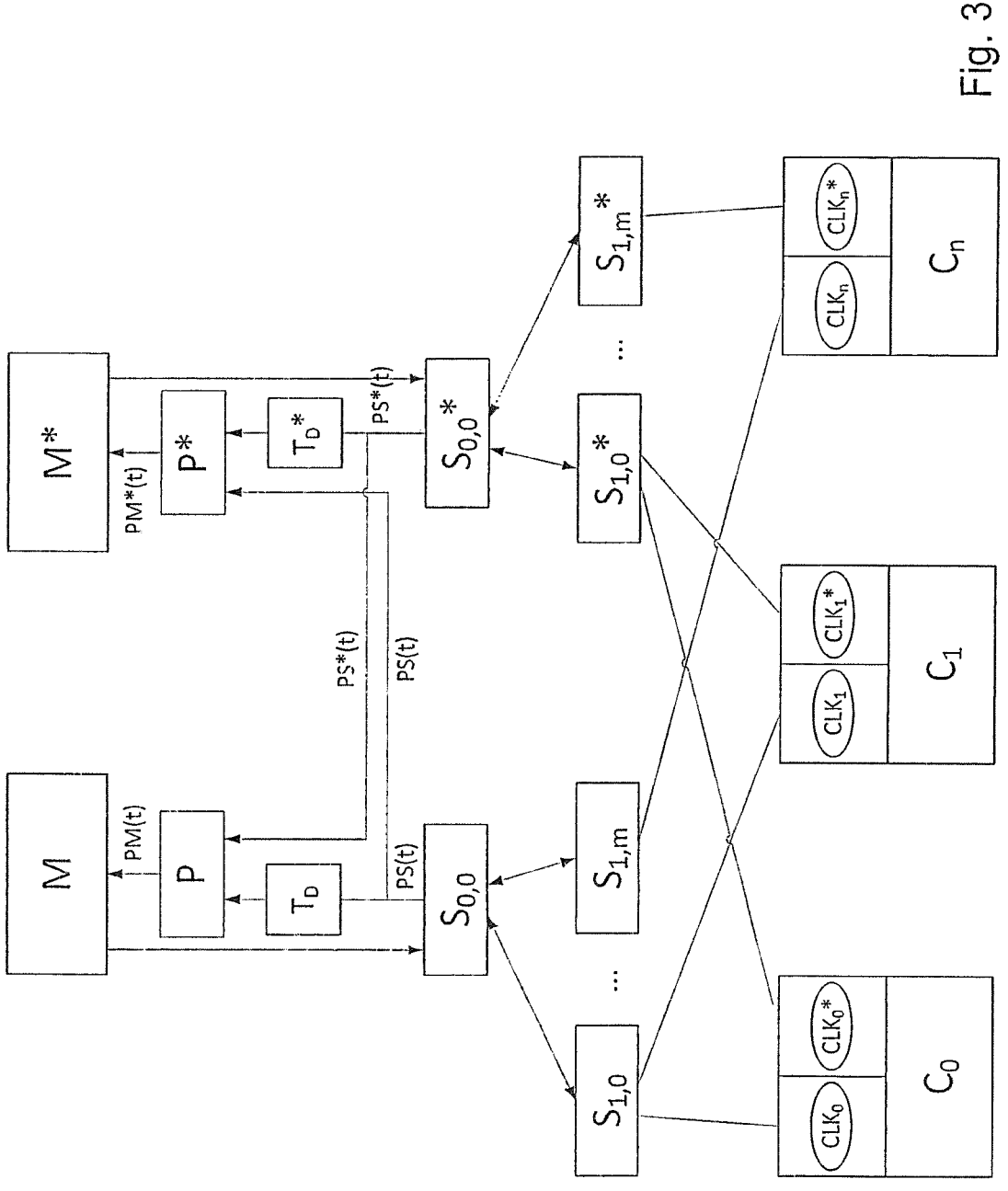
Figure 4:
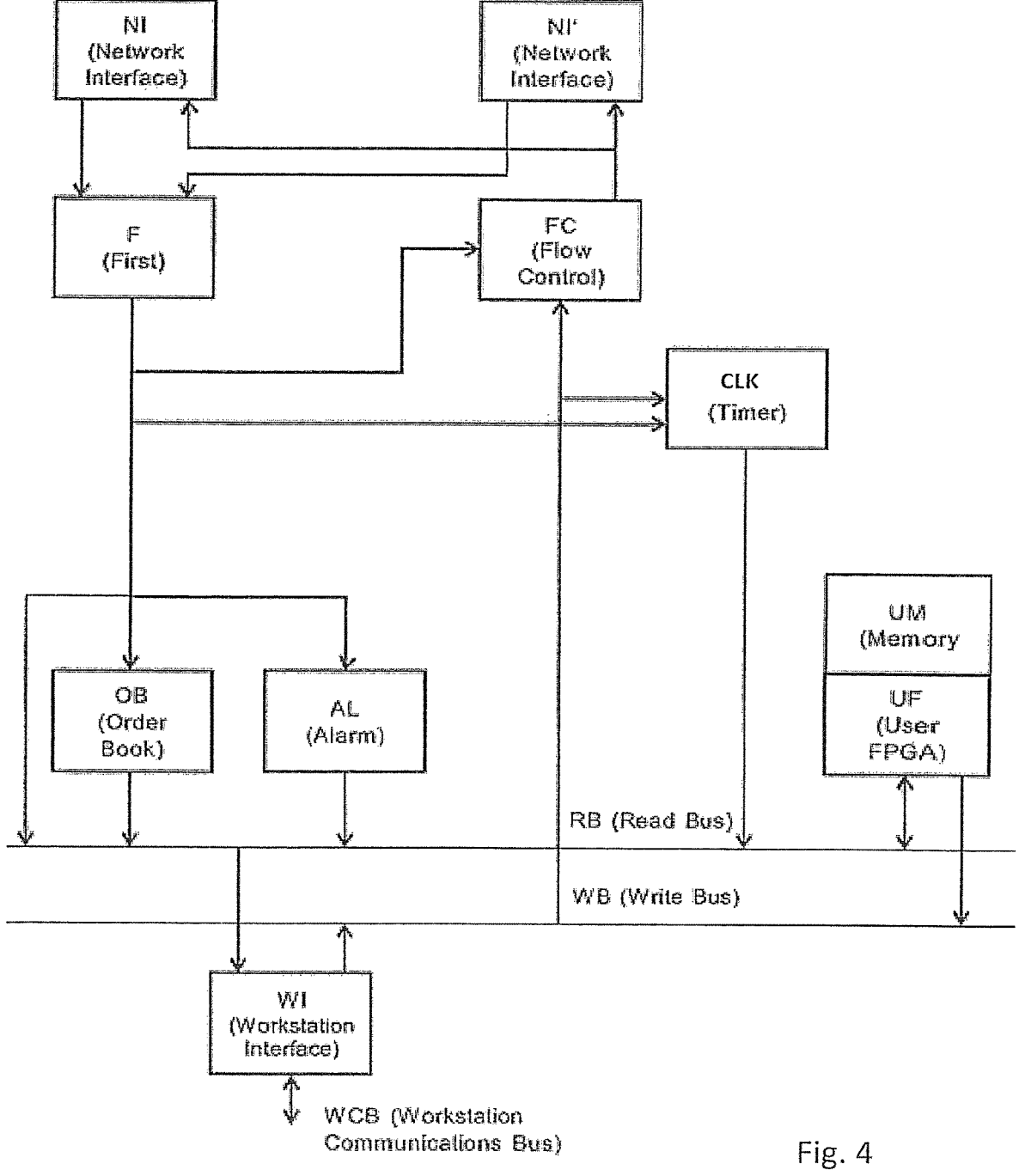
Figure 5:
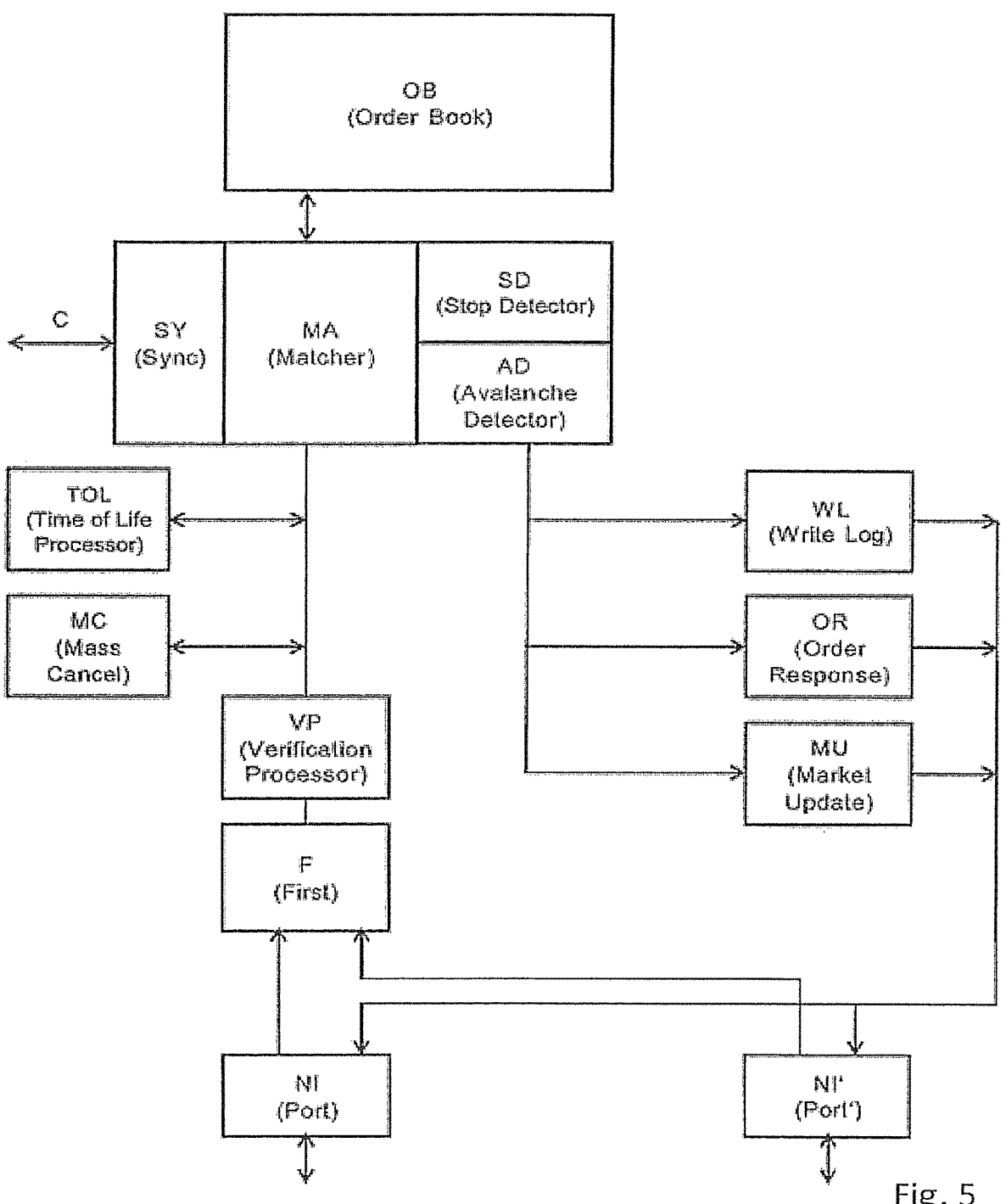

Principles and embodiment examples of the invention are hereinafter described by way of schematic drawings. There are shown in:

FIG. 1 a representation of a stock market trading system;

FIG. 2 elements of a switch S, of a trading platform data processing device and of trader data processing devices;

FIG. 3 a redundant system;

FIG. 4 elements of the network interface;

FIG. 5 elements of a trading platform data processing device; and

Figure 6:
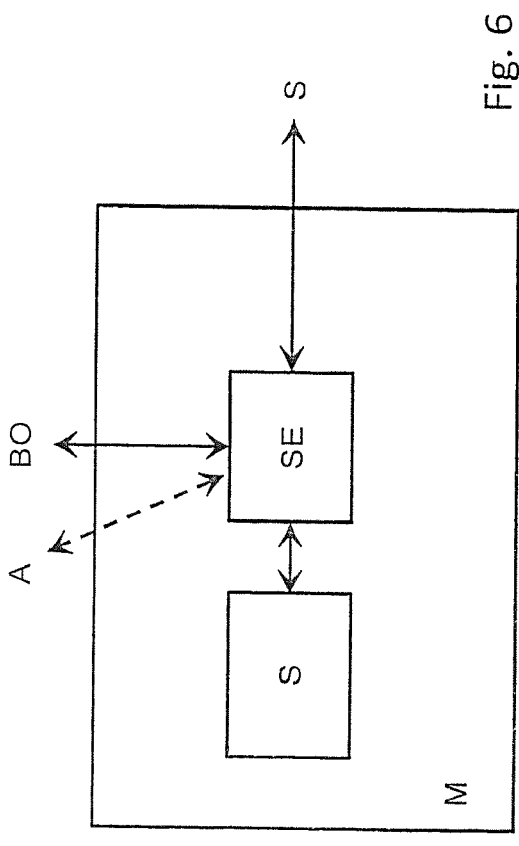

FIG. 6 schematic elements of a matcher.

Network architecture which is favourable for the rapid communications for stock exchange systems is represented in FIG. 1. It is thereby the case of a hierarchical network which is optimally adapted to the communication requirements in stock exchange applications. In the drawing embodiment example, several trading platform data processing devices (matchers $M_1$ . . . $M_m$) are present, i.e. the function of the matcher is divided onto several matchers. Each matcher is then responsible for one or more titles. The transfer to the correct matcher can be effected by the central switch $S_0$, for example by way of the target address.

$S_0$ is the central switch, via which the trader data processing devices (here indicated as clients ($C_1$, . . . $C_k$)) communicate with the matcher. An optional further switch level with decentralised switches S is moreover drawn in the represented embodiment example, wherein at least one trader data processing device (generally several trader data processing devices) are connected to each of these decentralised switches. An expansion to yet further levels and accordingly yet further architecture branching in a tree-like manner is also possible. The approach with the decentralised switches permits a good scalability, and may be indicated in the situation in which the central switch does not physically have enough interfaces to all traders. It can be advantageous if each trader is connected to the central switch via the same number of levels, since the transfer times are then roughly identical and, with the approach with a sorting according to a timestamp and which is discussed above, the waiting time before a message (for example order) is transferred upwards can be kept shorter.

In FIG. 1, TB indicates the network interfaces (trader boards) of the trader data processing devices. $D_i$ stands for the so-called downlinks of the switches, U or $U_i$ for the respective uplink.

The uppermost switch (i.e. the uppermost network node) can moreover optionally have a further output which stores all relevant messages which are transferred by this switch, in an archive A and thus makes this information available for example to the order post-processing system (backoffice), for further processing. This option exists independently of whether only one matcher or, as in FIG. 1, several matchers are applied. However, this option is particularly favourable with the application of several matchers, since it permits a central archiving. Alternatively or supplementarily, each matcher can also have an individual archive A, (drawn in the uppermost plane in FIG. 1).

The inner circuitry of a switch S is represented symbolically in FIG. 2. The construction which is represented in FIG. 2 for example is applied in particular in the switch of the uppermost level, i.e. the uppermost network node. Switches of the levels lying therebelow—inasmuch as they are present—can optionally also be designed accordingly, wherein at least the broadcast function should also be implemented onto the levels possibly lying therebelow.

In FIG. 2, components generally belonging to so-called uplinks (in the direction of the matcher) also have a "U" in the reference, and components belonging to downlinks (in the direction of the trader) have a "D".

In FIG. 2, only one matcher M is drawn, and in the case of a division of the matcher function onto several matchers, a division on account of the addresses yet takes place on the uplink side of the switch.

In the embodiment represented in FIG. 2, different paths for the data flows, on the one hand from the traders in the direction of the matcher and on the other hand from the matcher (embodiments with several matchers are also to be included in each case in this text) to the traders, are present in the switch.

A message (data packet; in particular with an order) is transmitted from the trader data processing device (here indicated as a client $C_1$ . . . $C_n$) via a transmitter Tx (a transmitter component). Thereby, a conversion for example into a serial data format takes place. This is received in the switch S and again for example converted in parallel ($KDRx_0$ . . . $KDRx_n$) and written into the buffer ($UB_0$ . . . $UB_n$). Thereby, a dedicated buffer is assigned to each first receiver ($KDRx_0$ . . . $KDRx_n$; i.e. to each downlink), in the drawn embodiment example. It would also be possible to provide a central buffering in alternative embodiments.

The first arbiter UA decides on which packet is transferred further and controls the multiplexer UM accordingly. The data is now converted by the first switch transmitter KUTx again into a serial protocol, transmitted and converted again into parallel format by a matcher receiver MRx. The message reaches the matcher M via an optional matcher buffer MB.

If now the matcher M sends a message (for example the acknowledgment of receipt of an order) to a specific trader $C_0$ . . . $C_n$, then this message is converted via a matcher transmitter MTx again into a serial format, transmitted and received by the second switch receiver KURx and converted again into a parallel format. The second arbiter DA, by way of the address, now decides which trader $C_0$ . . . $C_n$ is to obtain the message, and closes the respective switch $DD_0$, $DD_1$ . . . or $DD_n$. The message is subsequently transmitted via a second switch transmitter $KTDx_0$ . . . $KDTx_n$ to the respective trader-receiver $Rx_0$ . . . $Rx_n$ and is now available to the trader $C_n$ for further processing.

Apart from the specific communication between the matcher and a specific trader $C_0$ . . . $C_n$ and which has been described above, there is yet the broadcast case: matcher to all traders $C_0$ . . . $C_n$. This case differs from the specific case in that the second arbiter DA recognises that it is the case of a broadcast message and now closes all switches $DD_0$ . . . $DD_n$, so that finally the data packets are transmitted to all traders $C_0$ . . . $C_n$.

The circuit which is represented in FIG. 2 according to the second aspect of the invention corresponds exactly to the initially mentioned communication pattern. The switches which are actuated by the arbiters UA, DA permit communications of the three types a) to c), but not however for example a direct point-to-point communications between traders.

In the drawn embodiment example, each trader data processing device is provided with a time generator, here in the form of a precisely synchronised clock $CLK_0 \ldots CLK_n$. The time reference for this clock can thereby be set by the matcher or by the uppermost network node (the uppermost switch), by way of this periodically sending out reference time messages, which then reset the local clocks $CLK_0 \ldots CLK_n$. The actual clock cycle can thereby be produced by a local oscillator or also by the global network cycle which in turn is set by the matcher M. In the embodiment example, each message from the client $C_0 \ldots C_n$ is now provided with a timestamp, and the network system ensures that older messages always arrive at the matcher first of all; the network therefore "sorts" the messages on account of the time. This function here is effected by way of the first arbiter UA transferring the older message first of all. The arbiter must await at least the time (waiting time) which arises due to unequal construction manners (e.g. cable lengths, component tolerances), so that this selection take its course fairly. Only then can the arbiter make its decision. The messages are therefore ordered strictly according to time, on each uplink or at least on the uplink of the uppermost network node, and with this arrive at the trading system M in the correct temporal sequence (also via several switch levels).

This optional principle of the time sorting can be combined with each of the aspects 1 to 3.

Even with such architecture, it may still occur that individual traders $C_0 \ldots C_n$ send many messages, and a switch S thus becomes overloaded. This would be manifested in a buffer overflow in one of the buffers $UB_0 \ldots UB_n$. A credit system can optionally be introduced in order to prevent this: the trading system allots credits to all traders $C_0 \ldots C_n$. A credit permits the trader to send an order (or more generally: a message). The number of credits is so large that an individual trader can still operate at full speed in the case of a non-loaded system and that the individual buffers do not overflow even with a highly loaded system. A credit is deducted per message and is only credited when an acknowledgment of receipt has been sent from the matcher to the trader.

The arrows at the bottom in FIG. 2 indicate the use of a local time basis, for the provision of the data packets with a timestamp before the dispatch or sending, as previously outlined. Whilst the receiver and the transmitter of the trader data processing device are drawn separately in FIG. 2, in reality they can be realised in one and the same hardware component, for example as separately configured units in one and the same FPGA.

FIG. 3 shows a redundant system. The principle of the redundancy is illustrated here by way of an embodiment example, with which the matcher is responsible for all titles. The implementation into a system as is represented in FIG. 1, with matchers $M_1, \ldots M_m$ with different competences is possible without further ado, wherein then at least one matcher, preferably all matchers is/are present in duplicate and each are connected to both uppermost network nodes $S_{0,0}, \ldots S_{0,0}*$. Inasmuch as an archive A is connected to the uppermost network node, this can also be designed in a redundant manner, i.e. be present in duplicate.

The matcher M is duplicated to M*, as well as the network with the switches $S_{i,j}$ with $S_{i,j}*$, in FIG. 3. One of the two matchers M or M* (in corresponding embodiment examples) can thereby set the time (time master, i.e. the network cycle as well as the reference time), and the other matcher then adopts this time. In the case of a failure of one matcher, the other becomes the time master, if it was not already hitherto the time master. Both matchers are constructed in a completely identical manner with regard to the actual processing of orders, and the accounting and execution of the orders take place in both independently of one another.

The received message flows are transferred to the respective other trading system (PS(t) and PS*(t)), in order to ensure that both trading systems are in possession of all information, even with a partial failure of the network. So that their individual message flows are not favoured by the transmission, these are delayed by a delay time TD and TD*. The prioritisers P and P* now ensure that messages with earlier timestamps are taken first of all. Identical messages (which arrive via the two independent networks) are moreover suppressed in the prioritiser P. One can therefore guarantee that identical, temporarily ordered message flows are transmitted to the actual trading systems M and M*.

A network interface (designed here as a network card; trader board TB), as identically encompassed by each trader data processing device for example, is drawn schematically in FIG. 4. WI (workstation interface) indicates the interface to the central unit, NI the interface to the network nodes of the trading system. In the drawn embodiment, the network interface is configured for a redundantly designed trading system, and accordingly comprises two interfaces NI and NI' which are provided for connection to a network node point (switch) of the redundant system in each case. Since incoming relevant messages—for example the acknowledgment of receipt of an order, messages concerning a completed trade or messages concerning the condition of the order book—generally arrive twice on account of such an optional redundant design, an input filter (F First) ensures that identical messages are not transferred twice, i.e. the first valid message is transferred and all further copies are suppressed. Incoming messages via the read bus RB can be read and processed by the central unit, as is known per se.

The central storage of titles takes place in the OB (offer book) and is permanently tracked by the dedicated logic, on the basis of the incoming messages (market updates).

According to the third aspect of the invention, the network interface (network card) of each trader data processing device however moreover has a memory UM for the titles which are of relevance to the respective trader, as well as a rapid, programmable computation unit UF (user FPGA) which is designed as a dedicated logic circuit. The trader is therefore put in the position of being able to react even more quickly to events on the stock exchange.

More extensive (additionally to updating the order book (OB)) and customers-specific logic (in particular algorithms) are integrated in the memory UM and the computation unit UF.

The data flow control unit FC realises a flow control, in order to realise the optional overload protection based on credits, which has been discussed above. Only a certain number of unacknowledged orders is permitted, before the trader data processing device refuses further orders.

In the shown example, the network interface has at least one network interface bus, which here is functionally divided onto a write bus and a read bus. It is via the bus that messages arriving from the network are transferred on the one hand to the central unit and messages (orders or like-wise) from the central unit on the other hand to the network (specifically: the network interface). The computation device which is designed as a dedicated logic circuit is arranged directly on this bus, i.e. it is capable of reading data running via the bus as well as writing data via this onto other units.

The network interface bus is different from the bus of the central unit (WCB workstation communication bus), wherein an interface (WI workstations interface) connects both bus systems. This means that the internal data exchange of the central unit—for example between its CPU and the periphery or data memories—does not overload the network interface bus.

The trader data processing device can moreover be informed extremely promptly when a certain event occurs, with the help of the alarm unit (AL) (e.g. if a certain market value has been reached). The trader data processing device can additionally be relieved with the help of this additional function of the trader card.

It is often desirable for the trader to recognise the time for the individual trade at a very high time resolution. A time generator CLK is optionally located on the network interface TB, in order to achieve this aim—and thereby it can be the case of a time generator CLK of the previously described type and function, or it can also be the case of a separate timer. If the trader wishes to react very quickly to a change in the market, then he must firstly transfer the data on the network interface to the trader data processing device, process it there and subsequently write it back onto the network interface.

FIG. 5 shows an embodiment example of a trading platform (network nodes (switches) are not drawn). Thereby OB indicates the data memory with the order book, MA the actual matcher, whose controlling unit is designed as a dedicated logic circuit, in particular as an FPGA, in accordance with the first aspect of the invention. A synchronisation unit SY Sync which together with the corresponding unit of the other matcher in a system with two redundant matchers (FIG. 3) coordinates the mutual monitoring and synchronisation of the two matchers, a stop detector SD and an avalanche detector AD (detector of message avalanches) are connected to the matcher and for example are integrated with this with regard to hardware.

At the input side, the messages are firstly optionally introduced through an input filter (F First) and/or a verification processor VP examining whether the customer is authorised to carry out a certain order, and/or are made available to a time-of-life processor (TOL) which automatically deletes orders after completion of a time limit, and/or a mass cancel unit can intervene, in order to immediately delete all open orders of a certain trading participant out of the system in single order.

One or more of the following units can be present at the output side:
　　a write-event protocol file (WL write log: serves for the logging for the order post-processing system (backoffice));
　　an order response unit (OR order response; produces "private" (only envisaged for one trader data processing device) notifications concerning an order);
　　a market update unit (MU market update; produces notifications concerning a certain order to all).

The trading platform data processing device with two network interfaces (NI port, NI' port) is drawn in FIG. 5, i.e. it is designed for a redundant system, as is represented in FIG. 3.

FIG. 6 very schematically shows the matcher M. This, apart from the controlling unit SE which is designed as a dedicated logic circuit, in particular as a FPGA, comprises a data memory. This can be designed as a RAM and/or be optionally divided onto different physical units. Various RAM technologies can be applied, and combined with one another as the case may be, for example SDRAM, QDRII, SRAM, wherein SDRAM for example can be applied as the actual data memory and QDRII and/or SRAM for accelerator structures. The application of other memories such as SSD for example is not ruled out. The data memory or units of these can be present, physically integrated with the dedicated logic circuit and/or separately from this, for example on a circuit board.

The data memory comprises the order book which is managed by the controlling unit. If an order arrives from the switch, the controlling unit compares this to the data present in the order book. If an at least partly matching order is present, then the matching orders are executed, and this is acknowledged to the both issuers of the order, and transferred to the order post-processing system or backoffice BO, as well as per broadcast to all participants in an anonymous form. Should the incoming order only be able to be partly carried out or not at all, due to the lack of matching stored orders, then it is stored in the data memory. Its entry—but of course not its execution—is then also acknowledged. The procedure of the comparison of incoming orders with stored orders according to defined rules is the key task of the matcher.

The invention claimed is:

1. A switch, in an electronic platform for stock market trading, the platform disposed for rapid electronic trading,
　　the electronic platform comprising a trading platform data processing device with memory means and with a controlling unit and the switch, via which switch the trading platform data processing device is connected to a plurality of trader data processing devices which are arranged to submit messages with orders contained therein, to the trading platform;
　　wherein the controlling unit is designed to process these messages and thereby to compare the received orders with stored orders which are stored in the memory means and which form an order book, and, depending on a result of the comparison, to store a received order in the memory means or, given a matching order already stored in the memory means, to at least partly carry it out, to delete the matching order at least partly in the memory means, or to mark it as executed, and to acknowledge the storage or at least partial execution, to the trader data processing device, as well as to transfer transaction data concerning the executed orders to an order post-processing system;
　　wherein the switch comprises a switching logic, wherein the switching logic only permits three types of communication, namely messages (a) from a trader data processing device to the trading platform data processing device, (b) from the trading platform data processing device to a certain trader data processing device and (c) from the trading platform data processing device to a group of trader data processing devices or to all trader data processing devices, and does not permit messages from a trader data processing device to any other trader data processing device,
　　the switch comprising, in the switch, physically different paths, on the one hand for data flows from the trader data processing devices in the direction of the trading platform data processing device and on the other hand from the trading platform data processing device in the direction of the trader data processing devices, wherein a first path from the trader data processing device to the trading platform data processing device permits a transfer only of a message coming from one of the inputs, in the direction of the trading platform data processing device, whereas a second path from the trading platform data processing device to the trader data processing devices selectively permits a point-to-point connection or a broadcast connection.

2. The switch according to claim 1, wherein the switch is designed as an FPGA.

3. An electronic platform for stock market trading, the platform disposed for rapid electronic trading, the platform comprising:

a trading platform data processing device with memory means and with a controlling unit and at least one switch, via which switch the trading platform data processing device is connected to a plurality of trader data processing devices which are arranged to submit messages with orders contained therein, to the trading platform;

wherein the controlling unit is designed to process these messages and thereby to compare the received orders with stored orders which are stored in the memory means and which form an order book, and, depending on a result of the comparison, to store a received order in the memory means or, given a matching order already stored in the memory means, to at least partly carry it out, to delete the matching order at least partly in the memory means, or to mark it as executed, and to acknowledge the storage or at least partial execution, to the trader data processing device, as well as to transfer transaction data concerning the executed orders to an order post-processing system;

wherein a switching logic of the at least one switch only permits three types of communication, namely messages (a) from a trader data processing device to the trading platform data processing device, (b) from the trading platform data processing device to a certain trader data processing device and (c) from the trading platform data processing device to a group of trader data processing devices or to all trader data processing devices, and does not permit messages from a trader data processing device to any other trader data processing device;

the switch comprising, in the switch, physically different paths, on the one hand for data flows from the trader data processing devices in the direction of the trading platform data processing device and on the other hand from the trading platform data processing device in the direction of the trader data processing devices, wherein a first path from the trader data processing device to the trading platform data processing device permits a transfer only of a message coming from one of the inputs, in the direction of the trading platform data processing device, whereas a second path from the trading platform data processing device to the trader data processing devices selectively permits a point-to-point connection or a broadcast connection.

4. The electronic platform according to claim 3, wherein the switch is designed as an FPGA.

5. The electronic platform for stock market trading of claim 3, comprising a network; wherein the at least one switch is part of the network and comprises several levels of switches in a tree-like hierarchical arrangement, wherein each trader data processing device is connected to the trading platform data processing device via an identical number of switches.

6. The electronic platform for stock market trading of claim 5 wherein:

each trader data processing device is provided with a time generator, and each message from the trader data processing devices is provided with a time stamp generated by the time generator; and the messages are sorted by the network in that in each switch of the tree-like hierarchical arrangement of the switches the messages are sorted according to the time stamp, in that an older message is forwarded first.

7. The electronic platform for stock market trading of claim 3, wherein the at least one switch has a further output which is distinct from an output by which the at least one switch communicates with the trading platform data processing device, and the at least one switch is configured to store, via the further output, all relevant messages which are transferred to the at least one switch by the trader data processing devices, in an archiving unit, wherein the archiving unit is configured to archive these messages.

8. The electronic platform for stock market trading of claim 3, further comprising a central switch, distinct from the at least one switch, the central switch having a further output which is distinct from an output by which the central switch communicates with the trading platform data processing device, and the central switch is configured to store, via the further output, all relevant messages which are transferred to the central switch by the trader data processing devices in an archiving unit, wherein the archiving unit is configured to archive these messages.

* * * * *